(12) United States Patent
Shimizu et al.

(10) Patent No.: US 7,681,677 B2
(45) Date of Patent: Mar. 23, 2010

(54) INTAKE STRUCTURE IN FUEL CELL POWERED VEHICLE, AND MOTORCYCLE WITH FUEL CELL MOUNTED THEREON

(75) Inventors: Masahiro Shimizu, Saitama (JP); Yoshiyuki Horii, Saitama (JP); Jun Morimoto, Saitama (JP); Ranju Imao, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 559 days.

(21) Appl. No.: 11/446,134

(22) Filed: Jun. 5, 2006

(65) Prior Publication Data

US 2006/0278452 A1 Dec. 14, 2006

(30) Foreign Application Priority Data

Jun. 6, 2005 (JP) ............................. 2005-165223
Jun. 6, 2005 (JP) ............................. 2005-165224

(51) Int. Cl.
*B60K 1/00* (2006.01)
(52) U.S. Cl. ..................................... 180/65.31; 429/19
(58) Field of Classification Search ................ 180/68.1, 180/68.2, 68.3, 65.31, 65.8; 429/12, 13, 429/17, 20, 22, 26, 19
See application file for complete search history.

(56) References Cited

U.S. PATENT DOCUMENTS

| | | | | |
|---|---|---|---|---|
| 5,193,635 A | * | 3/1993 | Mizuno et al. | 180/65.3 |
| 5,641,031 A | * | 6/1997 | Riemer et al. | 180/65.3 |
| 5,662,184 A | * | 9/1997 | Riemer et al. | 180/65.1 |
| 6,013,385 A | * | 1/2000 | DuBose | 429/17 |
| 6,223,843 B1 | * | 5/2001 | O'Connell et al. | 180/65.3 |
| 6,322,917 B1 | * | 11/2001 | Acker | 429/17 |
| 6,378,637 B1 | * | 4/2002 | Ono et al. | 180/65.3 |
| 6,436,562 B1 | * | 8/2002 | DuBose | 429/13 |
| 6,638,651 B2 | | 10/2003 | Katagiri et al. | |
| 6,699,609 B2 | * | 3/2004 | Kotani et al. | 429/26 |
| 6,994,178 B2 | * | 2/2006 | Mizuno | 180/65.3 |
| 7,070,633 B2 | * | 7/2006 | Okada et al. | 48/61 |
| 7,141,326 B2 | * | 11/2006 | Kobayashi et al. | 429/13 |
| 7,192,665 B2 | * | 3/2007 | Nakajima et al. | 429/22 |

(Continued)

FOREIGN PATENT DOCUMENTS

DE 43 18 818 A1 12/1994

(Continued)

*Primary Examiner*—Hau V Phan
(74) *Attorney, Agent, or Firm*—Birch, Stewart, Kolasch & Birch, LLP.

(57) ABSTRACT

An intake structure in a fuel cell powered vehicle including a fuel cell using air and hydrogen as fuels, a supercharger for compressing the outside air and outputting the compressed air, a humidifier for humidifying the air compressed by the supercharger, a bypass passage for connecting the supercharger and the fuel cell to each other, and a bypass valve for opening and closing the bypass passage. The bypass valve is disposed on the outside relative to a straight line T1 connecting between the supercharger and the humidifier, and is disposed in the vicinity of the supercharger and the humidifier. With this configuration supercooling of a humidifier can be prevented, while eliminating the need for a warming member for the humidifier. Further, the intake system members can be efficiently arranged in the vehicle, while suppressing the pressure loss in the intake system.

17 Claims, 7 Drawing Sheets

U.S. PATENT DOCUMENTS

| | | | |
|---|---|---|---|
| 7,195,282 B2 * | 3/2007 | Mizuno | 280/830 |
| 7,255,945 B2 * | 8/2007 | Enjoji et al. | 429/13 |
| 7,264,233 B2 * | 9/2007 | Katagiri et al. | 429/34 |
| 7,270,899 B2 * | 9/2007 | Kato et al. | 180/65.3 |
| 7,335,430 B2 * | 2/2008 | Kuriiwa et al. | 429/12 |

FOREIGN PATENT DOCUMENTS

| | | |
|---|---|---|
| DE | 298 00 386 U1 | 5/1998 |
| DE | 101 02 358 A1 | 8/2001 |
| DE | 102 01 302 A1 | 8/2002 |
| DE | 102 14 078 A1 | 10/2002 |
| DE | 10 2004 013 487 A1 | 10/2004 |
| DE | 10 2004 022 312 A1 | 9/2005 |
| JP | 2001-216981 A | 8/2001 |
| JP | 2004-152600 A | 5/2004 |

* cited by examiner

INTAKE STRUCTURE IN FUEL CELL POWERED VEHICLE, AND MOTORCYCLE WITH FUEL CELL MOUNTED THEREON

CROSS-REFERENCE TO RELATED APPLICATION

The present application claims priority under 35 U.S.C. §119 to Japanese Patent Application Nos. 2005-165223, and 2005-165224, both filed Jun. 6, 2005, the entire contents of which are hereby incorporated by reference.

BACKGROUND OF THE INVENTION

1. Field of the Invention

The present invention relates to an intake structure for a fuel cell in a fuel cell powered vehicle, and a motorcycle with a fuel cell mounted thereon to which the structure is applied.

2. Description of Background Art

Conventionally, as an intake system in a fuel cell powered vehicle, there has been a system in which air (oxidizer gas) supercharged by a supercharger is supplied to a fuel cell after being humidified by a humidifier. The exhaust gas from the fuel cell is returned to the humidifier, where moisture is extracted, and new intake air to be supplied to the fuel cell is humidified with the extracted moisture. In this instance, if the humidifier is cooled excessively, the degree of saturation of the water vapor is so lowered that it becomes difficult to extract the moisture. In view of this, there has been a system in which a heat medium (cooling water) having been used for cooling the fuel cell is circulated around the humidifier for the purpose of warming the humidifier (see, for example, Japanese Patent Laid-open No. 2001-216981.)

In the conventional configurations as above-mentioned, however, it is necessary to set warming members such as a water jacket and a water pump for circulating the cooling water around the humidifier, which may lead to increases in the cost and weight of the vehicle. Therefore, there is a demand for improving these points.

In addition, in some conventional systems, a bypass valve is provided for changing over an intake line for permitting the compressed air to bypass the humidifier at a low temperature time such as a starting time of the fuel cell (see, for example, Japanese Patent Laid open No. 2004 152600.)

Meanwhile, in the intake system of the fuel cell powered vehicle as above, it is necessary to arrange many intake system members such as a supercharger, a bypass valve, and a humidifier. Particularly in consideration of the case where the vehicle is of a small type, as in the case of a motorcycle, it is desirable that the intake system members can be arranged efficiently in a small layout space and that a pressure loss in the intake system is suppressed.

SUMMARY AND OBJECTS OF THE INVENTION

Accordingly, it is an object of the present invention to provide an intake structure in a fuel cell powered vehicle and a motorcycle with a fuel cell mounted thereon such that the supercooling of a humidifier can be prevented while eliminating the need for warming members for the humidifier. Another object of the present invention is to provide an arrangement structure of intake system members in a fuel cell powered vehicle such that the intake system members can be arranged efficiently, while suppressing the pressure loss in the intake system.

As a means for solving the above-mentioned problems, according to a first aspect of the present invention, an intake structure is provided in a fuel cell powered vehicle (for example, a fuel cell powered vehicle 1 in the embodiment). The invention includes a fuel cell (for example, a fuel cell 51 in the embodiment) for generating electric power supplied to a motor (for example, a motor 31 in the embodiment) serving as a drive source for the vehicle, using air and hydrogen as fuels, a supercharger (for example, a supercharger 58 in the embodiment) for compressing the outside air and outputting the compressed air, and a humidifier (for example, a humidifier 59 in the embodiment) for humidifying the air compressed by the supercharger, supplying the compressed and humidified air to the fuel cell, separating water vapor contained in an off-gas discharged from the fuel cell and humidifying the air newly supplied to the fuel cell. Further, the supercharger is disposed in the periphery of the humidifier.

According to this configuration, the degree of saturation of water vapor in the humidifier can be prevented from being lowered. Specifically, while compression of the air in the supercharger generates heat in the periphery, the arrangement of the humidifier adjacently to the supercharger makes it possible to restrain the lowering in the temperature of the humidifier, while eliminating the need for a special warming member for warming the humidifier.

According to a second aspect of the present invention, the fuel cell is disposed in the periphery of and adjacently to the humidifier.

According to this configuration, the heat generated by the fuel cell can be effectively utilized for warming the humidifier, and the lowering in the temperature of the humidifier can be more restrained.

According to a third aspect of the present invention, the intake structure further includes a control unit (for example, a VCU 62 in the embodiment) for controlling the supply of electric power to the motor or the like, and the control unit is disposed in the periphery of and adjacently to the humidifier.

According to this configuration, the heat generated by the control unit including a heat generating element such as an FET can be effectively utilized for warming the humidifier, and the lowering in the temperature of the humidifier can be further restrained.

According to a fourth aspect of the present invention, the supercharger, the fuel cell, and the control unit are disposed in a roughly ring-like pattern around the humidifier.

According to this configuration, the lowering in the temperature of the humidifier can be further restrained, and the layout space in the fuel cell powered vehicle can be made efficient.

According to a fifth aspect of the present invention, the humidifier has a water vapor exchange portion (for example, a water vapor exchange portion 59a in the embodiment) extending in the vehicle width direction, and at least one of the supercharger, the fuel cell, and the control unit is so disposed as to face the outer periphery of the water vapor exchange portion.

According to this configuration, the opposed areas between a part, such as the supercharger, and the water vapor exchange portion can be broadened, and the heat generated by the supercharger, the fuel cell, and the control unit can be efficiently transferred to the water vapor exchange portion.

According to a sixth aspect of the present invention, the structure also includes a bypass passage (for example, a bypass passage 87a in the embodiment) for connecting the output side of the supercharger and the fuel cell to each other while bypassing the humidifier, and a bypass valve (for example, a bypass valve 87 in the embodiment) for opening and closing the bypass passage, characterized in that the bypass valve is disposed on the outside relative to a straight line connecting between the supercharger and the humidifier, and is disposed in the vicinity of the supercharger and the humidifier.

According to this configuration, the layout space in the fuel cell powered vehicle can be made efficient, and the intake system members can be arranged efficiently. Particularly, in a vehicle with a small layout space for members, such as a motorcycle, it is extremely important in what places the many intake system members are to be arranged, and the effect of the efficient arrangement of these members is therefore high.

In addition, the pressure loss in the intake system of the fuel cell powered vehicle can be reduced. To be more specific, a reduction in the pressure loss can be contrived, by reducing the lengths of connection members such as intake pipes between the supercharger and the humidifier, and between the humidifier and the fuel cell.

According to a seventh aspect of the present invention, the structure also includes an inter cooler (for example, an inter cooler 86 in the embodiment) connected to the output side of the supercharger and operative to regulate the temperature of air supplied to the humidifier is provided, the inter cooler is disposed on the outside relative to the straight line, and the bypass valve is disposed in a space (for example, a space K1 in the embodiment) surrounded by the supercharger, the humidifier, and the inter cooler.

According to this configuration, the bypass valve is arranged in the triangular space formed by the arrangement of the humidifier, the supercharger, and the inter cooler, whereby the layout space in the fuel cell powered vehicle can be made more efficient.

According to an eighth aspect of the present invention, a fuel cell is mounted on a motorcycle (for example, the fuel cell powered vehicle 1 in the embodiment). The motorcycle includes a vehicle body frame (for example, a vehicle body frame 4 in the embodiment), a seating position (for example, a seat 41 in the embodiment) attached to the vehicle body frame, a fuel cell (for example, the fuel cell 51 in the embodiment) disposed on the lower side of the seating position for generating electric power supplied to a motor (for example, the motor 31 in the embodiment) serving as a drive source for the vehicle, using air and hydrogen as fuels, a supercharger (for example, the supercharger 58 in the embodiment) for compressing the outside air and outputting the compressed air, and a humidifier (for example, the humidifier 59 in the embodiment) for humidifying the air compressed by the supercharger, supplying the compressed and humidified air to the fuel cell, separating water vapor coming from the fuel cell and humidifying the air newly supplied to the fuel cell, wherein the supercharger is disposed in the periphery of and adjacently to the humidifier.

According to this configuration, the degree of saturation of water vapor in the humidifier can be prevented from being lowered. Specifically, while compression of the air in the supercharger generates heat in the periphery, the arrangement of the humidifier adjacently to the supercharger makes it possible to restrain the lowering in the temperature of the humidifier, while eliminating the need for a special warming member for warming the humidifier.

According to a ninth aspect of the present invention, the supercharger and the humidifier are disposed on the rear side of the fuel cell.

According to this configuration, the lowering in the temperature of the humidifier can be further restrained. Specifically, while the supercharger and the humidifier may both be cooled under the influence of running airflows in the case where the supercharger and the humidifier are disposed on the front side of the fuel cell, the arrangement of the supercharger and the humidifier on the rear side of the fuel cell ensures that the supercharger and the humidifier would not be easily influenced by the running airflows.

According to a tenth aspect of the present invention, the motorcycle includes a main frame 10 in the embodiment) with a down frame portion (for example, a down frame portion 10a) extending skewly downwards toward the vehicle rear side from a head pipe (for example, a head pipe 5), an intermediate frame portion (for example, an intermediate frame portion 10b) extending toward the vehicle rear side from the rear end of the down frame portion, and a rear frame portion (for example, a rear frame portion 10c) extending skewly upwards toward the vehicle rear side from the rear end of the intermediate frame portion, a rear frame (for example, a rear swing arm 21 in the embodiment) with a drive wheel (for example, a rear wheel 32 in the embodiment) movably supported thereon being swingably connected to the main frame, and a riders' seat (for example, a seat 41) being disposed on the upper side of the main frame, a bypass passage (for example, a bypass passage 87a) for connecting the output side of the supercharger and the fuel cell to each other while bypassing the humidifier, and a bypass valve (for example, a bypass valve 87 in the embodiment) for opening and closing the bypass passage. The bypass valve is disposed on the outside relative to a straight line (for example, a straight line T1 in the embodiment) connecting between the supercharger and the humidifier, and is disposed in the vicinity of the supercharger and the humidifier.

According to this configuration, the layout space in the fuel cell powered vehicle can be made efficient, and the intake system members can be arranged efficiently. Particularly, in a vehicle with a small layout space for members, as a motorcycle, it is extremely important in what places the many intake system members are to be arranged, and the effect of the efficient arrangement of these members is therefore high.

In addition, the pressure loss in the intake system of the fuel cell powered vehicle can be reduced. To be more specific, a reduction in the pressure loss can be contrived, by reducing the lengths of connection members such as intake pipes between the supercharger and the humidifier, and between the humidifier and the fuel cell.

According to an eleventh aspect of the present invention, the supercharger, the humidifier, and the bypass valve are disposed in a space (for example, a front portion space K3 in the embodiment) located on the lower side of the seat and on the upper side of the rear frame.

According to this configuration, the layout space can be made further efficient, through effective utilization of the dead space between the seat and the rear frame in the fuel cell powered vehicle.

EFFECTS OF THE INVENTION

According to the first to fifth and eighth aspects of the present invention, supercooling of the humidifier can be prevented, while eliminating the need for a special warming member for warming the humidifier. Particularly, this effect is high in a motorcycle which is small in size and weight of the vehicle body and which is high in the property of being cooled by running airflows.

According to the second and third aspects of the present invention, the lowering in the temperature of the humidifier can be more restrained.

According to the fourth aspect of the present invention, the lowering in the temperature of the humidifier can be restrained, and a higher efficiency of layout space can be contrived.

According to the fifth aspect of the present invention, the heat generated by the supercharger, the fuel cell, and the control unit can be efficiently transferred to the water vapor exchange portion.

According to the sixth and tenth aspects of the present invention, the intake member can be arranged efficiently, and the pressure loss in the intake system can be reduced.

According to the seventh aspect of the present invention, efficiency of layout space in a fuel cell powered vehicle can be enhanced.

According to the ninth aspect of the present invention, the lowering in the temperature of the humidifier by the running airflows in the motorcycle can be further restrained.

According to the eleventh aspect of the present invention, effective utilization can be made of a dead space in a fuel cell powered vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
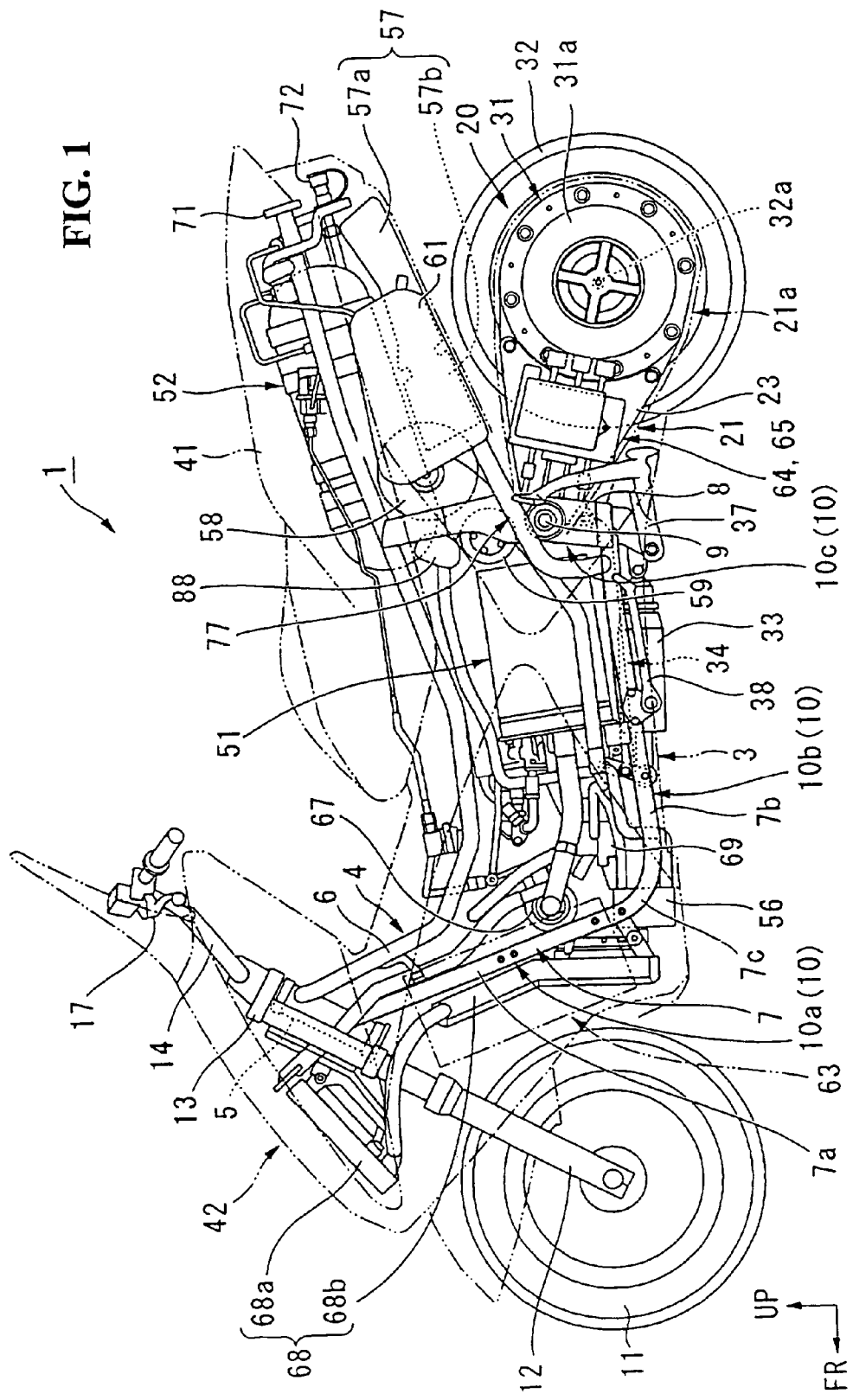
FIG. 1 is a left side view of a fuel cell powered vehicle according to an embodiment of the present invention.

Now, an embodiment of the present invention will be described below referring to the drawings. Incidentally, the senses of the front, rear, left, right and so on in the following description are the same as the senses in the vehicle, unless otherwise specified. In addition, arrow FR in the drawings indicates the vehicle front side, arrow LH indicates the vehicle left side, and arrow UP indicates the vehicle upper side.

Figure 2:
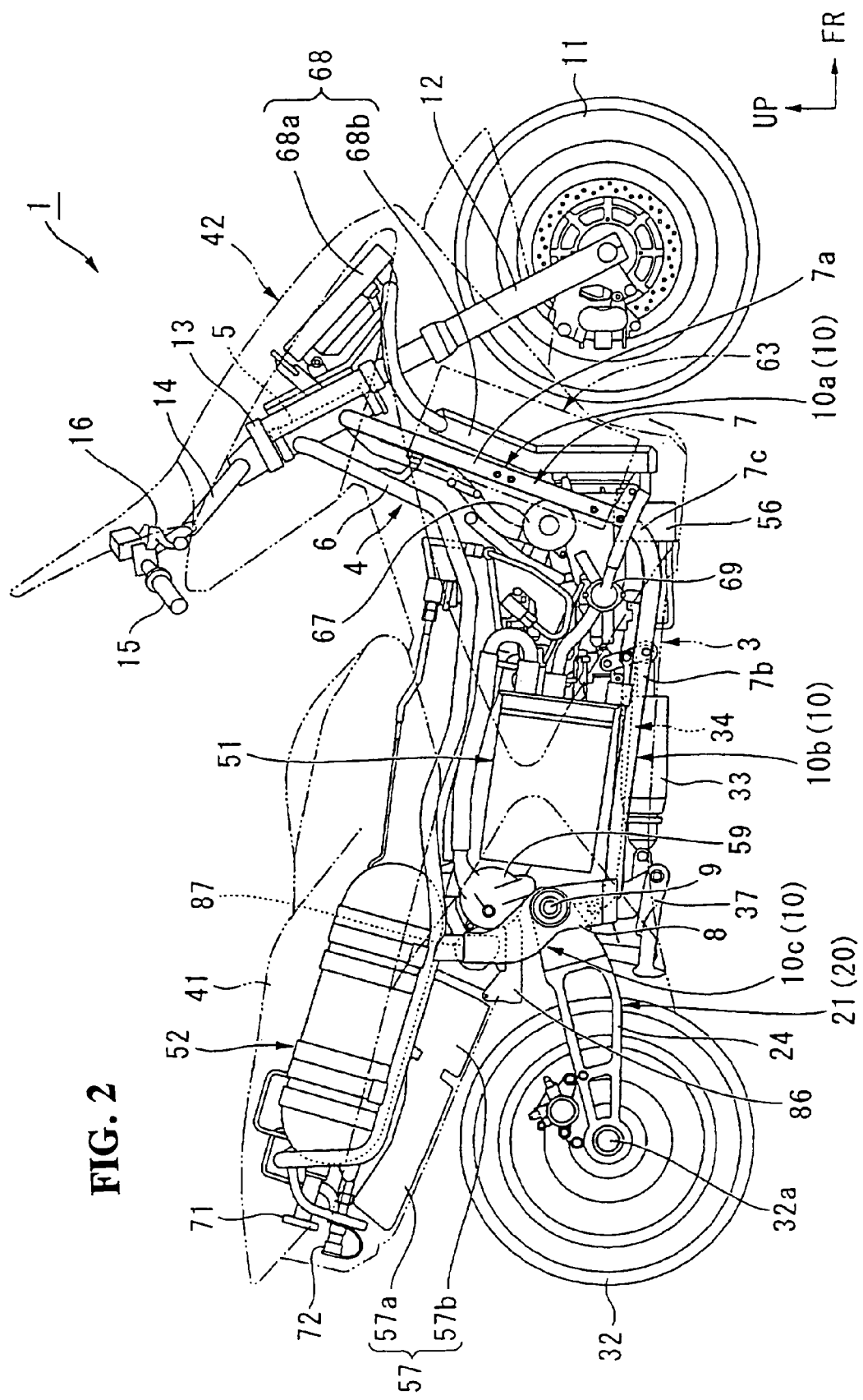
FIG. 2 is a right side view of the fuel cell powered vehicle.
Figure 3:
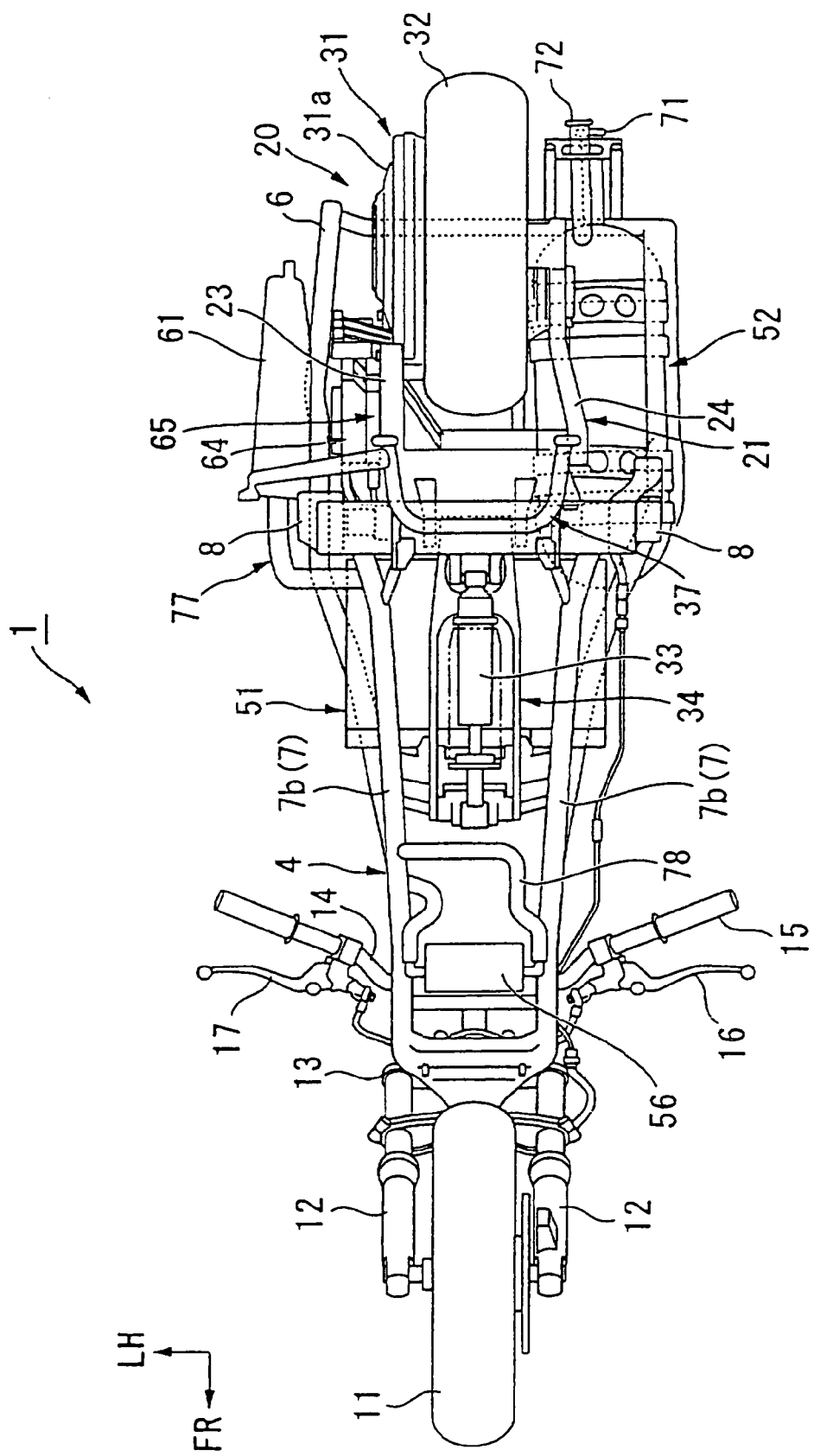
FIG. 3 is a bottom view of the fuel cell powered vehicle.

As shown in FIGS. 1 to 3, a fuel cell powered vehicle 1 in the form of a motorcycle runs by driving a motor 31 for driving the vehicle, based on electric power supplied from a fuel cell 51 mounted on a roughly central portion of the vehicle body. In addition, the fuel cell powered vehicle 1 is also a motor scooter type vehicle having a low floor portion (hereinafter referred to simply as the floor portion) 3, wherein the fuel cell 51 having a roughly rectangular parallelopiped shape is disposed on the inside of the floor portion 3, and the motor 31 as the so-called wheel-in motor is disposed in the wheel of a rear wheel 32 which is the drive wheel of the fuel cell powered vehicle 1.

The motor 31 is configured as an integral unit having a motor main body and a speed reduction mechanism disposed in a casing 31*a* thereof, and is mounted in the wheel, for example from the left side, in the condition where an output shaft thereof is disposed coaxially with a rear wheel axle 32*a*.

A front wheel 11 of the fuel cell powered vehicle 1 is rotatably supported by a left-right pair of lower end portions of a front fork 12, and an upper portion of the front fork 12 is steerably supported on a head pipe 5 at a front end portion of a vehicle body frame 4 through a steering stem 13. A bar-type steering handle 14 is mounted to an upper end portion of the steering stem 13, a throttle grip 15 is mounted to a right grip portion of the steering handle 14, and a rear and front brake levers 16 and 17 are disposed on the front side of the left and right grip portions, respectively.

A pivot plate 8 extending vertically in the state of being slightly inclined so that an upper portion thereof is located on the rear side is provided at a rear portion of the vehicle body frame 4, and a front end portion of a rear swing arm (rear frame) 21 is movably supported on a portion slightly on the lower side relative to an intermediate portion of the pivot plate 8, through a pivot shaft 9, in such a manner that the rear end side thereof can be swung in the vertical direction of the vehicle body. The rear swing arm 21 is so configured that a left arm body 23 thereof extends to a front end portion of the motor 31 so as to support the casing 31*a* of the motor 31, whereas a right arm body 24 thereof extends to the center position of the rear wheel 32 so as to rotatably support the rear wheel axle 32*a*. The rear swing arm 21 and the motor 31 are main components for constituting a motor unit 20 as a swing unit of the fuel cell powered vehicle 1.

A rear cushion 33 extending in the vehicle body front-rear direction is disposed at a portion which is a lower portion of the vehicle body frame 4 and which is located on the lower side of the fuel cell 51. A rear end portion of the rear cushion 33 is connected to a lower portion of the vehicle body frame 4, whereas a front end portion of the rear cushion 33 is connected to a lower portion of the motor unit 20 (the rear swing arm 21) through a link mechanism 34. The link mechanism 34 is for putting the rear cushion 33 into strokes in the front-rear direction attendant on the swing in the vertical direction of the motor unit 20, and such strokes of the rear cushion 33 results in moderate absorption of shocks and vibrations which are inputted to the motor unit 20.

The vehicle body frame 4 has upper tubes 6 branched to the left and the right from an upper portion of the head pipe 5, extended skewly rearwardly downwards, bent at a roughly middle height in the vehicle body vertical direction, and then extended rearwards, and down tubes 7 branched to the left and the right from a lower portion of the head pipe 5, extended skewly rearwardly downwards, bent at lower end portions of the vehicle body, and then extended rearwards. A rear end portion of each of the upper tubes 6 and a rear end portion of each of the down tubes 7 are joined respectively to an upper end portion and a lower end portion of the pivot plate 8 located on the rear side relative to the fuel cell 51. In the following description, of the down tube 7, the portion ranging from the head pipe 5 to the bent portion 7*c* at the lower end portion of the vehicle body will be referred to as a front side portion 7*a*, and the portion ranging from the bent portion 7*c* to the pivot plate 8 will be referred to as a lower side portion 7*b*.

Here, the upper tubes 6, the down tubes 7, and the pivot plate 8 constitute a down frame portion 10a extending skewly downwardly rearwards from the head pipe 5, an intermediate frame portion 10b extending rearwards from the rear end of the down frame portion 10a, and a rear frame portion 10c extending skewly upwardly downwards from the rear end of the intermediate frame portion 10b; these frame portions 10a, 10b, and 10c constitute a main frame 10 of the fuel cell powered vehicle 1 which is a motor scooter type vehicle.

Each of the upper tubes 6 extends further rearwards from the pivot plate 8 so as to reach a rear end portion of the vehicle body, and a rear half portion of each upper tube 6 is used as a seat frame for supporting a riders' seat (seating position) 41. Specifically, the portions, located on the front side relative to the pivot plate 8 (the portions constituting the upper side of a rear portion of the main frame 10), of the upper tubes 6 support a driver's seat portion which is a front half of the seat 41, and the portions, located on the rear side relative to the pivot plate 8, of the upper tubes 6 support a passenger's seat portion which is a rear half of the seat 41. The fuel cell 51 is located on the lower side of the driver's seat position of the seat 41.

The fuel cell powered vehicle 1 has its vehicle body covered with a vehicle body cover 42 formed of a synthetic resin. The vehicle body cover 42 functions also as a windshield, and a part thereof constitute the floor portion 3 together with the vehicle body frame 4 (the main frame 10). A main stand 37 for supporting the vehicle body in an upright state is mounted to the center of a lower portion of the vehicle body frame 4, and a side stand 38 for supporting the vehicle body in a leftwardly inclined erected state is mounted to the left side of a lower portion of the vehicle body frame 4.

Here, the outline of a fuel cell system in the fuel cell powered vehicle 1 will be described referring to FIG. 4.

The fuel cell 51 is a known solid state polymer film type fuel cell (PEMFC) in which a multiplicity of unit cells are laminated, hydrogen gas as a fuel gas is supplied to the anode side thereof, and oxygen-containing air as an oxidizer gas is supplied to the cathode side thereof, whereby electric power is produced through an electrochemical reaction, attended by formation of water.

The hydrogen gas as a fuel gas is supplied to the fuel cell 51 at a predetermined pressure (in other words, in a predetermined high-pressure state) from a hydrogen cylinder 52 through a shut-off valve 53, and, after served to power generation, is introduced into hydrogen circulation line 54. In the hydrogen circulation line 54, the unreacted hydrogen gas is repeatedly supplied to the fuel cell 51, together with a fresh hydrogen gas fed from the hydrogen cylinder 52. The hydrogen gas circulated in the hydrogen circulation line 54 can be introduced into a dilution device 56 through a purge valve 55.

On the other hand, air as an oxidizer gas is introduced through an air cleaner device 57 into a supercharger 58, thereafter it is supplied to the fuel cell 51 in the state of being pressurized (compressed) to a predetermined pressure, and, after served to power generation, is introduced into the dilution device 56.

Figure 4:
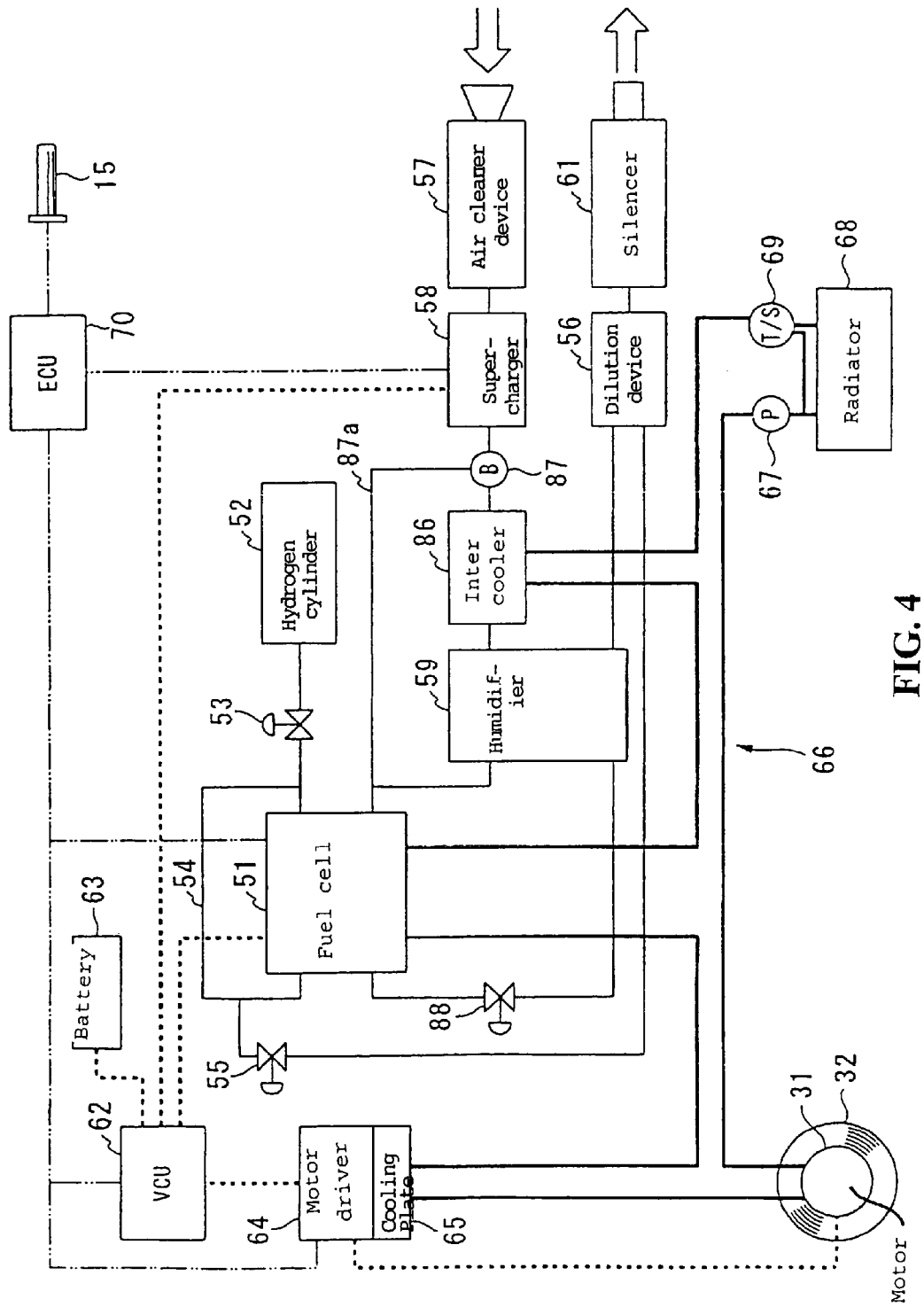
FIG. 4 is a main block diagram of a fuel cell system in the fuel cell powered vehicle.

FIG. 4 also illustrates, a water cooling type inter-cooler 86 is provided for cooling the air (oxidizer gas) that has been compressed by the supercharger 58, a humidifier 59 for humidifying the oxidizer gas having passed through the inter-cooler 86, a bypass passage 87a which connects the supercharger 58 and the fuel cell 51 to each other while bypassing the inter-cooler 86 and the humidifier 59, a bypass valve 87 for opening and closing the bypass passage 87a so as to permit the compressed air from the supercharger 58 to bypass the inter-cooler 86 and the humidifier 59 at a low-temperature time such as a starting time of the fuel cell 51, and a back pressure valve 88 for regulating the pressure of the oxidizer gas in the fuel cell 51.

When the purge valve 55 provided in the hydrogen circulation line 54 is opened, the hydrogen gas after reaction is introduced into the dilution device 56. The hydrogen gas accumulated in the dilution device 56 is diluted by being mixed with the exhaust air from the fuel cell 51, in the dilution device 56, before being discharged into the atmosphere through a silencer 61.

A part of the water produced in the fuel cell 51 is introduced into the humidifier 59 as water vapor together with the air (off-gas) exhausted from the fuel cell 51, and is served to warming of fresh air (oxidizer gas) to be supplied into the fuel cell 51. Incidentally, the moisture not extracted in the humidifier 59 is discharged as water vapor together with the reacted gas after passing through the dilution device 56, or is discharged through a drain pipe or the like after being condensed in the dilution device 56.

The operation of the fuel cell system is controlled by an ECU (Electrical Control Unit) 70 and a VCU (Voltage Control Unit; control unit) 62.

The ECU 70 is connected to the VCU 62. The ECU 70 performs control of power generation in the fuel cell 51, control of recovered electric power in the motor 32, and the like, based on a throttle opening signal from the throttle grip 15, a brake signal, a vehicle speed signal, and the like.

The VCU 62 is composed of a switching element such as FET, which is a heat generation source, and the like, and performs conversion (for example, a boosting chopper treatment) of the electric power supplied from a battery 63 and the fuel cell 51, supply of necessary electric power to a motor driver 64, the supercharger 58, etc., based on commands from the ECU 70. Specifically, for example, based on the commands from the ECU 70, the VCU 62 regulates the voltages supplied to the supercharger 58 and the like, and regulates the pressure of air supplied to the fuel cell 51, thereby contriving an increase in the electric power output from the fuel cell 51, and the like. Incidentally, though omitted in the figure, the VCU 62 is connected to all the electrically driven component parts such as the purge valve 55, the shut-off valve 53, the back pressure valve 88, the bypass valve 87, and a water pump 67.

A cooling system in the fuel cell system has a configuration in which a cooling water line 66 for communication among passages in water jackets for the fuel cell 51 and the motor 31, in the inter-cooler 86 and in a cooling plate (cooler) 65 adjacent to the motor driver 64 is formed, and the water pump 67 and a radiator 68 are provided in the cooling water line 66.

In such a cooling system, with cooling water passed and circulated in the cooling line 66 by the operation of the water pump 67, heat is absorbed from the fuel cell 51, the motor 31, the oxidizer gas, and the motor driver 64, and the heat is radiated by the radiator 68. Incidentally, symbol 69 in the figure denotes a thermostat for circulating the cooling water not through the radiator 68, at a low-temperature time of the fuel cell 51 or in the like situations.

Referring to FIGS. 1 to 3 together, the hydrogen cylinder 52 is a general high-pressure gas cylinder having a hollow cylindrical outlook, and is configured to be a general composite vessel composed of a metal and a fiber-reinforced plastic. The hydrogen cylinder 52 is disposed with its axis inclined slightly forwardly downwards, on the upper side of the rear wheel 32 and on the right side of a rear portion of the vehicle body. The hydrogen cylinder 52 is so disposed that its right side end (outside end) is located slightly on the outside relative to the outside end of the upper tube 6 on the right side of the vehicle body, and its left side end (inside end) is located slightly on the outside relative to the outside end of the rear wheel 32.

Front and rear end portions of the hydrogen cylinder 52 are formed in a spherical shape, and the hydrogen cylinder 52 is so disposed that its front end portion is located on the front side of the pivot plate 8 and its rear end portion is located at a rear end portion of the vehicle body. The hydrogen cylinder 52 is provided at its rear end portion with a main cock 71 and a hydrogen charging port 72.

The upper tube 6 on the left side of the vehicle body extends generally rectilinearly rearwards while being inclined slightly rearwardly upwards, and the upper tube 6 on the right side of the vehicle body is so provided as to be gradually varied downwards in the vicinity of the pivot plate 8 in relation to the upper tube 6 on the left side of the vehicle body. In addition, each of the upper tubes 6 is so provided as to be gradually varied to the outside in the vehicle width direction in the vicinity of the pivot plate 8.

Further, the upper tube 6 on the right side of the vehicle body is so provided that its lower end roughly overlaps with the lower end of the hydrogen cylinder 52 in vehicle body side view; in addition, the upper tube 6 is bent upwards at a vehicle body rear end portion, extends toward the left side of the vehicle body so as to avoid the main cock 71 and the hydrogen charging port 72 of the hydrogen cylinder 52, is then bent downwards, and is joined to a rear end portion of the upper tube 6 on the left side of the vehicle body.

The fuel cell 51 has a rectangular parallelopiped shape being wide in the vehicle width direction and flat in the vertical direction, and is provided at its front wall portion with supply and exhaust ports for the oxidizer gas and the hydrogen gas and with inlet and outlet ports for cooling water.

Figure 5:
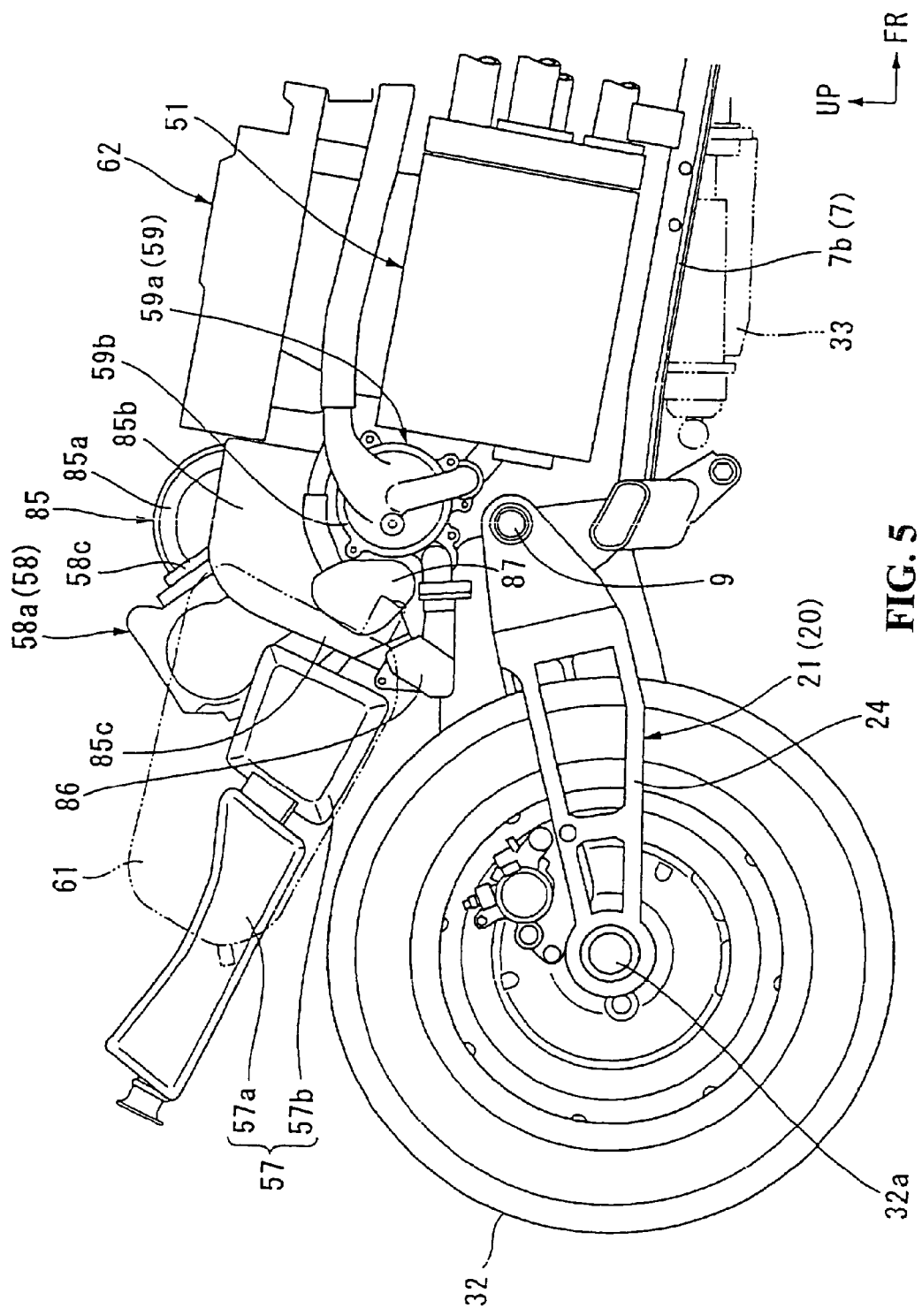
FIG. 5 is a right side view of an essential part of the fuel cell powered vehicle.
Figure 6:
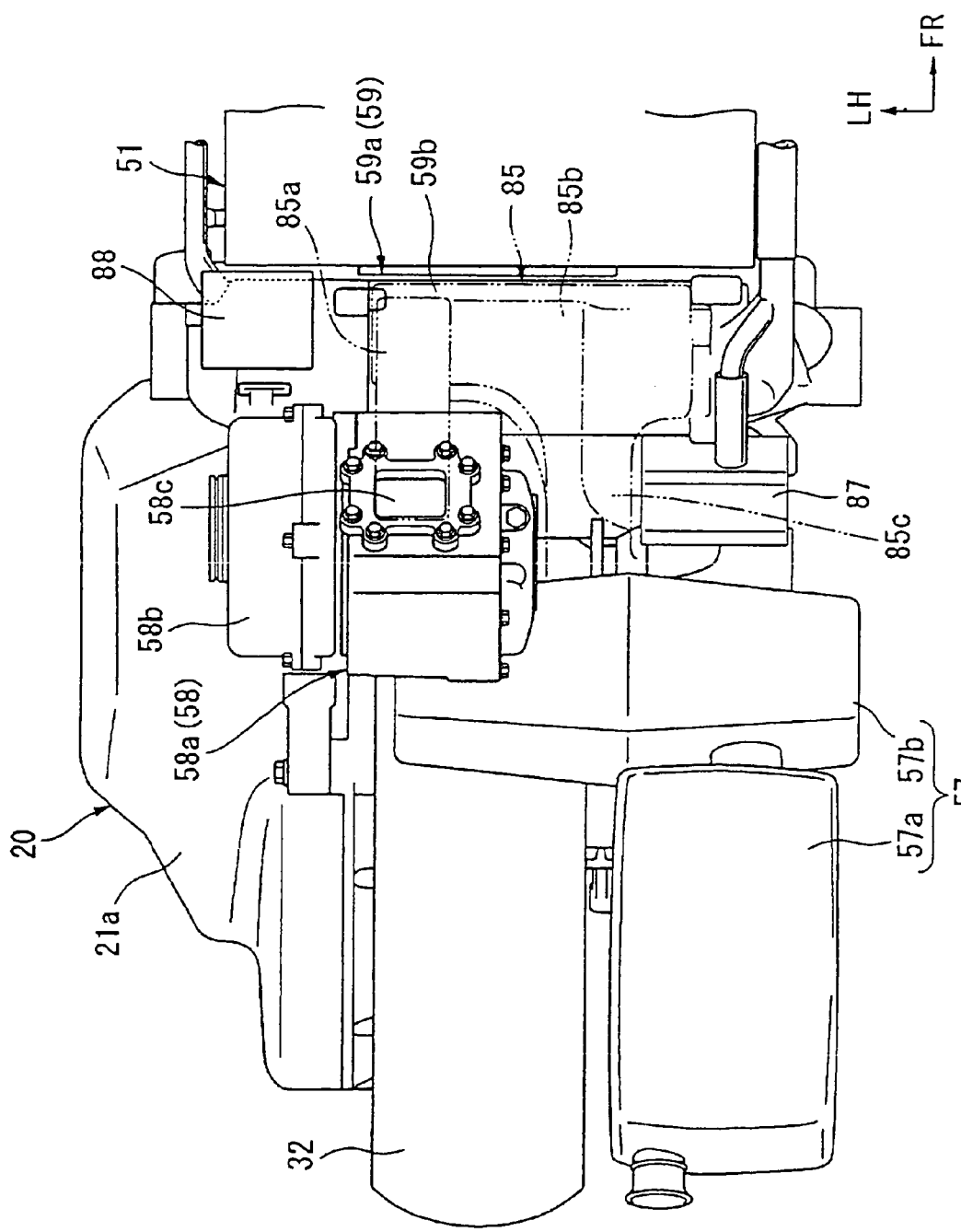
FIG. 6 is a top plan view of an essential part of the fuel cell powered vehicle.

Referring to FIGS. 5 and 6 also, the VCU 62 in the form of a box being flat in the vertical direction is disposed on the upper side of and in proximity to the fuel cell 51, the humidifier 59 extending in the vehicle width direction is disposed on the upper rear side of and in proximity to the fuel cell 51, and the supercharger 58 is disposed on the skewly upper rear side of and in proximity to a left side portion of the humidifier 59. The supercharger 58 has a configuration in which a drive motor 58*b* having a rotational axis in parallel to the vehicle width direction is disposed on the left side of a supercharger main body 58*a*, and a left side portion of an intake duct 57*b* extending in the vehicle width direction is connected to a skewly lower rear portion of the supercharger main body 58*a*.

The intake duct 57*b* is so provided that its right side portion is located on the lower side of the hydrogen cylinder 52, and a front end portion of an air cleaner case 57*a* also located on the lower side of the hydrogen cylinder 52 is connected to the right side portion of the intake duct 57*b*. The air cleaner case 57*a* and the intake duct 57*b* are main components for constituting the air cleaner device 57.

A discharge duct 85 having a chamber portion 85*b* is connected to a discharge port (output port) 58*c* on the skewly upper front side of the supercharger main body 58*a*. The discharge duct 85 extends from the discharge port 58*c* so as to form an upstream-side connection portion 85*a* extending in a circular arc form being convex to the upper side in side view, and then extends so as to broaden to the right side along the upper surface of a casing 59*b* of the humidifier 59, to form the chamber portion 85*b*. A downstream-side connection portion 85*c* extends toward the skewly lower rear side from the right side of the chamber portion 85*b*, and the downstream-side connection portion 85*c* is connected to the inter-cooler 86. The back pressure valve 88 is disposed on the upper side (the left side of the chamber portion 85*b*) of and in proximity to a left side portion of the humidifier 59, the bypass valve 87 is disposed on the rear side of and in proximity to a right side portion of the humidifier 59, and the inter-cooler 86 is disposed on the skewly lower rear side of and in proximity to the bypass valve 87.

The silencer 61 being flat in the vehicle width direction is disposed on the left side of a rear portion of the vehicle body so as to be located on the outer side in the vehicle width direction relative to the upper tube 6 on the left side of the vehicle body. The silencer 61 is roughly square in vehicle body side view, is disposed in the state of being inclined rearwardly upwards on the skewly upper left side of the rear wheel 32, and is provided at a rear half portion of an exhaust pipe 77 inclined rearwardly upwards.

The radiator 68 is dividedly composed of a comparatively small type upper-stage radiator 68*a* located on the front side of the head pipe 5, and a comparatively large type lower-stage radiator 68*b* located on the front side of the front side portions 7*a* of the down tubes 7. The water pump 67 is disposed on the right rear side of the lower-stage radiator 68*b*, and the thermostat 69 is disposed on the skewly lower rear side of the water pump 67. In addition, the batteries 63 being flat in the vehicle width direction are disposed respectively on the inside of the vehicle body cover 42 located on both lateral sides of the lower-stage radiator 68*b*.

The dilution device 56 is disposed between the bent portions 7*c* of the down tubes 7 so as to protrude to the lower side relative to the lower ends of the lower side portions 7*b*. An exhaust short pipe 78 is led out from the dilution device 56, the exhaust short pipe 78 is connected to the front side of the lower side portion 7*b* of the down tube 7 on the left side of the vehicle body, and the exhaust pipe 77 is led out from the rear side of the lower side portion 7*b*. Specifically, the down tube 7 on the left side of the vehicle body constitutes a part of the reacted gas exhaust passage, so that the exhaust gas from the dilution device 56 is discharged into the atmosphere through the exhaust short pipe 78, the lower side portion 7*b* of the down tube 7, and the exhaust pipe 77.

The motor driver 64 is roughly square in vehicle body side view, and is mounted to the outside, in the vehicle width direction, of the left arm body 23 of the rear swing arm 21 through the cooling plate 65.

An arm cover 21*a* as a part of the rear swing arm 21 is mounted to the motor unit 20. The arm cover 21*a* covers the rear swing arm 21, the motor 31, the motor driver 64, the cooling plate 65 and the like, and appropriately protect them. Incidentally, the arm cover 21*a* is provided with outside air inlet and outlet ports (not shown) for permitting distribution of the outside air in the inside thereof.

The humidifier 59 comprises, for example, a hollow fiber membrane module in the casing 59*b*, and humidifies a fuel gas by movement of moisture between the oxidizer gas yet to be supplied to the fuel cell 51 and the off-gas from the fuel cell 51 through the hollow fiber membrane module. The casing 59*b* has a hollow cylindrical shape elongate in the vehicle width direction, and is provided at both end portions thereof with inlet and outlet ducts for the oxidizer gas and the off-gas.

Here, the portion, for containing the hollow fiber membrane module, of the humidifier 59 is referred to as the water vapor exchange portion 59*a*; then, the supercharger 58, the fuel cell 51, and the VCU 62 are adjacently disposed in the surroundings of the water vapor exchange portion 59*a* so as to face the outer periphery of the latter. In other words, the supercharger 58, the fuel cell 51, and the VCU 62 are arranged in the periphery of the water vapor exchange portion 59*b* in a ring-like pattern around the humidifier 59 in vehicle body side view.

Further, the bypass valve 87 is disposed at a position which, in vehicle body side view, is between the supercharger 58 and the humidifier 59 and which is set off to the skewly lower rear side from a straight line T1 connecting between the supercharger 58 and the humidifier 59 and inclined rearwardly upwards. To be more specific, the bypass valve 87 is so arranged that its substantial center (for example, the center of the outside shape of a main body of the bypass valve 87) is located on the skewly lower rear side relative to the straight line T1 connecting between the substantial center of the supercharger 58 (for example, the rotation center of the drive motor 58b) and the substantial center of the humidifier 59 (for example, the center of the hollow cylindrical shape of the casing 59b) and inclined rearwardly upwards.

In addition, the inter cooler 86 is disposed on the skewly lower rear side of the bypass valve 87, so that the bypass valve 87 is disposed in a triangular space K1 surrounded by the inter cooler 86, the supercharger 58, and the humidifier 59, in vehicle body side view. To be more specific, the bypass valve 87 is so arranged that its substantial center is located in the triangular space K1 surrounded by straight lines connecting a substantial center of the inter cooler 86 (for example, the center of the outside shape of a main body of the inter cooler 86), the substantial center of the supercharger 58, and the substantial center of the humidifier 59. Incidentally, the bypass valve 87 is arranged to be located on the rear side relative to the rear end of the fuel cell 51.

In FIGS. 5 and 6, arrow 90 indicates the flow of the oxidizer gas along a main passage from the supercharger 58 through the bypass valve 87, the inter cooler 86, and the humidifier 59 to the fuel cell 51, and arrow 90' indicates the flow of the oxidizer gas along the bypass passage 87a from the supercharger 58 directly to the fuel cell 51.

The oxidizer gas flowing in the main passage flows to the skewly lower rear side along the downstream side connection portion 85c of the discharge duct 85, then turns back to the front side, flows through a right end portion of the humidifier 59 into the casing 59b of the humidifier 59, turns back to the right and the left, and then flows forwards again through the right end portion of the humidifier 59.

On the other hand, the oxidizer gas flowing in the bypass passage 87a once flows to the skewly lower rear side along the downstream side connection portion 85c, then passes through the bypass valve 87 adjacent to the right side of the downstream side connection portion 85c, turns back to the front side, enters the right end portion of the humidifier 59 from above so as to join the flow there, and then flows forwards.

A swing space K2 for permitting the swinging of the motor unit 20 and the rear wheel 32 is secured on the lower side of a rear portion of the vehicle body (the lower side of a rear portion of the seat 41). The swing space K2 is provided correspondingly to the wheel travel of the rear wheel 32, so that a front portion space K3 as a dead space would be generated at a position on the front side relative to the rear wheel 32. In this embodiment, however, the supercharger 58, the humidifier 59, the bypass valve 87, and the inter cooler 86 are so arranged as to front on the inside of the front portion space K3, in other words, as to be located on the upper side of a front portion of the rear swing arm 21 (a portion located on the front side relative to the rear wheel 32), whereby the intake system members are efficiently arranged by effectively utilizing the front portion space K3 present as a dead space.

As has been described above, the intake structure in the above embodiment is applied to the fuel cell powered vehicle 1 including the fuel cell 51 for generating electric power supplied to the motor 31 serving as a drive source of the vehicle, using air and hydrogen as fuels, the supercharger 58 for compressing the outside air and outputting the compressed air, and the humidifier 59 for humidifying the air compressed by the supercharger 58, supplying the compressed and humidified air to the fuel cell 51, separating the water vapor contained in the off-gas from the fuel cell 51, and humidifying the air newly supplied to the fuel cell 51. Further, the supercharger 58 is disposed in the periphery of and adjacently to the humidifier 59.

According to this configuration, the degree of saturation of water vapor in the humidifier 59 can be prevented from being lowered. Specifically, while compression of air in the supercharger 58 generates heat in the surroundings of the supercharger 58, the arrangement of the humidifier 59 adjacently to the supercharger 58 makes it possible to restrain the lowering in the temperature of the humidifier 59, while eliminating the need for a special warming member for warming the humidifier 59.

In addition, in the above intake structure, the fuel cell 51 is disposed in the periphery of and adjacently to the humidifier 59, whereby the heat generated by the fuel cell 51 can be effectively utilized for warming the humidifier 59, and the lowering in the temperature of the humidifier 59 can be more restrained.

Furthermore, in the intake structure as above, the VCU 62 is provided for controlling the supply of electric power to the motor and the like, and the VCU 62 is disposed in the periphery of and adjacently to the humidifier 59, whereby the heat generated by the VCU 62 including a heat generation element such as FET can be effectively utilized for warming the humidifier 59, and the lowering in the temperature of the humidifier 59 can be further restrained.

Here, in the above intake structure, the supercharger 58, the fuel cell 51, and the VCU 62 are arranged in a roughly ring-like pattern along the outer periphery of the humidifier 59, whereby the lowering in the temperature of the humidifier 59 can be restrained more effectively, and the layout space in the fuel cell powered vehicle 1 can be made efficient.

Moreover, in the intake structure as above, the humidifier 59 has the water vapor exchange portion 59a extending in the vehicle width direction, and the supercharger 58, the fuel cell 51, and the VCU 62 are arranged so as to face the outer periphery of the water vapor exchange portion 59a, whereby the opposed areas between the component parts, such as the supercharger 58, and the water vapor exchange portion 59a can be enlarged, and the heat generated by the supercharger 58, the fuel cell 51, and the VCU 62 can be efficiently transferred to the water vapor exchange portion 59a.

Furthermore, in the above intake structure, the supercharger 58 and the humidifier 59 are disposed on the rear side of the fuel cell 51, whereby the lowering in the temperature of the humidifier 59 can be further restrained. Specifically, while the supercharger 58 and the humidifier 59 may both be cooled under the influence of running airflows in the case where the supercharger 58 and the humidifier 59 are arranged on the front side of the fuel cell 51, the arrangement of the supercharger 58 and the humidifier 59 on the rear side of the fuel cell 51 ensures that the supercharger 58 and the humidifier 59 would not easily be influenced by the running airflows.

Still further as has been described above, the arrangement structure of intake system members according to the above embodiment is applied to the fuel cell powered vehicle 1 in the form of a motorcycle including the main frame 10 which includes a down frame portion 10a extending skewly downwards toward the vehicle rear side from the head pipe 5, the intermediate frame portion 10b extending toward the vehicle rear side from the rear end of the down frame portion 10a, and the rear frame portion 10c extending skewly upwards toward the vehicle rear side from the rear end of the intermediate frame portion 10b, the rear swing arm 21 with the rear wheel 32 movably supported thereon being swingably connected to the main frame 10, and the riders' seat 41 being disposed on the upper side of a rear portion the main frame 10, wherein the bypass passage 87a for connecting the discharge side of the supercharger 58 and the fuel cell 51 to each other while bypassing the humidifier 59, and the bypass valve 87 for opening and closing the bypass passage 87a, are provided. The bypass valve 87 is disposed on the outside relative to the straight line T1 connecting between the supercharger 58 and the humidifier 59, and is disposed in the vicinity of the supercharger 58 and the humidifier 59.

According to this configuration, the layout space in the fuel cell powered vehicle 1 can be made efficient, and the intake system members can be efficiently arranged. Particularly, in a vehicle with a small layout space for members, as in a motorcycle, it is extremely important in what spaces the many intake system members are to be arranged, and the effect of the efficient arrangement of these members is therefore high.

In addition, the pressure loss in the intake system of the fuel cell powered vehicle 1 can be reduced. Specifically, a reduction in the pressure loss can be contrived, by reducing the lengths of the connection members such as intake pipes between the supercharger 58 and the humidifier 59, and between the humidifier 59 and the fuel cell 51.

Also, in the arrangement structure as above described, the inter cooler 86 connected to the discharge side of the supercharger 58 and operative to regulate the temperature of air supplied to the humidifier 59 is provided, the inter cooler 86 is disposed on the outside relative to the supercharger 58 and the straight line T1, and the bypass valve 87 is disposed in the space K1 surrounded by the supercharger 58, the humidifier 59, and the inter cooler 86, whereby the bypass valve 87 is arranged in the space K1 being triangular in vehicle body side view which is formed by the arrangement of the humidifier 59, the supercharger 58, and the inter cooler 86, and the layout space in the fuel cell powered vehicle 1 can be made more efficient.

Furthermore, it is a characteristic feature that the supercharger 58, the humidifier 59, and the bypass valve 87 are arranged in the front portion space K3 located on the lower side of a rear portion of the seat 41 and on the upper side of a front portion of the rear swing arm 21.

According to this configuration, the front portion space K3 present as a dead space between the seat 41 and a front portion of the rear swing arm 21 in the fuel cell powered vehicle 1 is effectively utilized, whereby the layout space can be made further efficient.

Figure 7A:
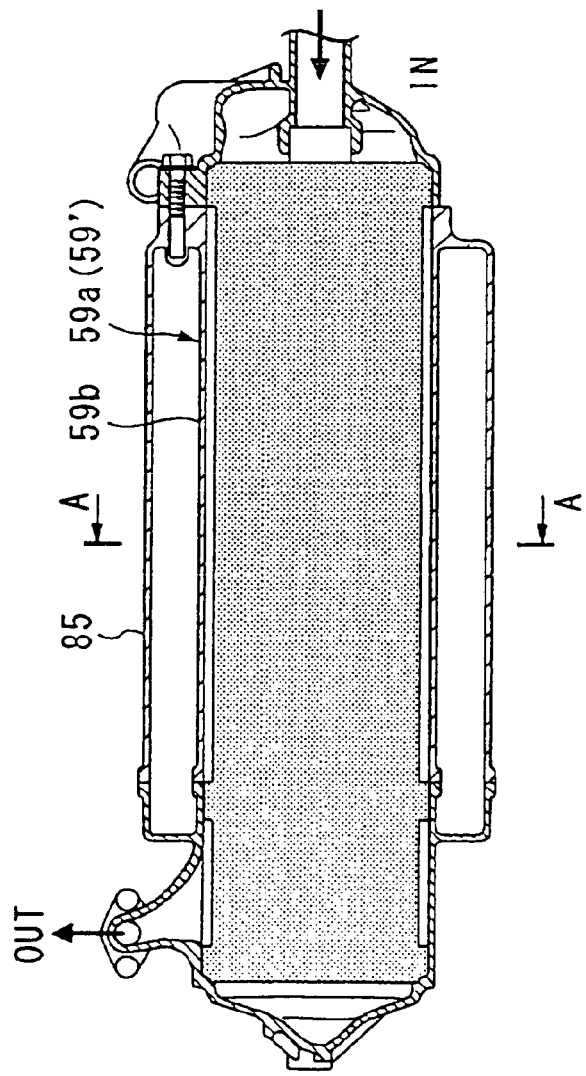
FIG. 7(*a*) is a sectional view along the longitudinal direction of a humidifier in the fuel cell powered vehicle, and FIG. 7(*b*) is a sectional view along line A-A of FIG. 7(*a*).
Figure 7B:
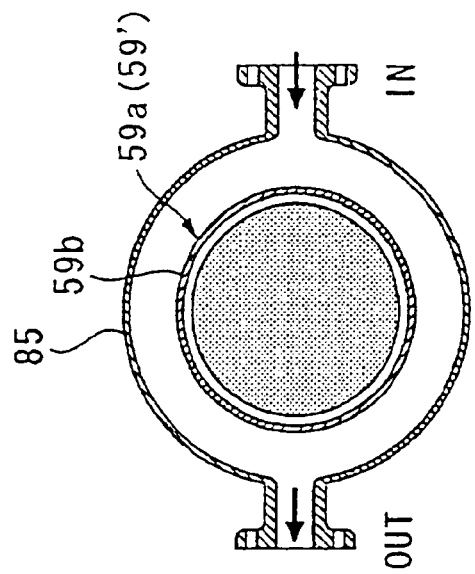

Incidentally, the present invention is not limited to or by the above-described embodiment. For example, as in a humidifier 59' shown in FIG. 7, a configuration may be adopted in which the outer periphery of the casing 59b thereof (the outer periphery of the water vapor exchange portion 59a) has a double-wall structure, and the double-wall structure portion constitute a part of the discharge duct 85 extending from the discharge port 58c of the supercharger 58, whereby the water vapor exchange portion 59a of the humidifier 59 is directly warmed by use of the high-temperature oxidizer gas having just been discharged from the supercharger 58.

As another example, even in the case where the inter cooler 86 is not provided, a configuration suffices in which the bypass valve 87 is disposed at a position set off from the straight line T1 connecting between the supercharger 58 and the humidifier 59. In addition, the position of the bypass valve 87 is not limited to the lower side of the straight line T1 but may be on the upper side, on the front or rear side, or the like, relative to the straight line T1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An intake structure in a fuel cell powered vehicle, comprising:
    a fuel cell for generating electric power supplied to a motor serving as a drive source for said vehicle, using air and hydrogen as fuels;
    a supercharger for compressing the outside air and outputting said compressed air; and
    a humidifier for humidifying said air compressed by said supercharger, supplying said compressed and humidified air to said fuel cell, separating water vapor contained in an off-gas discharged from said fuel cell and humidifying the air newly supplied to said fuel cell,
    wherein said supercharger is disposed in a periphery of and adjacently to said humidifier,
    wherein said supercharger is disposed in a position that is higher in the vehicle and further toward a rear of the vehicle than each of the humidifier and the fuel cell.

2. The intake structure in a fuel cell powered vehicle as set forth in claim 1, wherein said fuel cell is disposed in the periphery of and adjacently to said humidifier.

3. The intake structure in a fuel cell powered vehicle as set forth in claim 2, further comprising:
    a control unit for controlling the supply of electric power to said motor,
    wherein said control unit is disposed in the periphery of and adjacently to said humidifier.

4. The intake structure in a fuel cell powered vehicle as set forth in claim 1, further comprising:
    a control unit for controlling the supply of electric power to said motor,
    wherein said control unit is disposed in the periphery of and adjacently to said humidifier.

5. The intake structure in a fuel cell powered vehicle as set forth in claim 4, wherein said supercharger, said fuel cell, and said control unit are disposed in a pattern around said humidifier that is substantially ring-shaped.

6. The intake structure in a fuel cell powered vehicle as set forth in claim 1,
    wherein said humidifier has a water vapor exchange portion extending in the vehicle width direction, and at least one of said supercharger, said fuel cell, and said control unit is disposed so as to face the outer periphery of said water vapor exchange portion,
    wherein said water vapor exchange portion is a hollow-fiber membrane portion.

7. The intake structure in a fuel cell powered vehicle as set forth in claim 1, wherein said humidifier has a water vapor exchange portion is provided in a casing having a hollow cylindrical shape elongate in the vehicle width direction, and the casing is surrounded by a cylindrically-shaped discharge duct having a chamber portion and a discharge port connected to the supercharger.

8. An intake structure in a fuel cell powered vehicle, comprising:
    a fuel cell for generating electric power supplied to a motor serving as a drive source for said vehicle, using air and hydrogen as fuels;

a supercharger for compressing the outside air and outputting said compressed air; and a humidifier for humidifying said air compressed by said supercharger, supplying said compressed and humidified air to said fuel cell, separating water vapor contained in an off-gas discharged from said fuel cell and humidifying the air newly supplied to said fuel cell, wherein said supercharger is disposed in a periphery of and adjacently to said humidifier, and further comprising:

a bypass passage for connecting an output side of said supercharger and said fuel cell to each other while bypassing said humidifier; and a bypass valve for opening and closing said bypass passage, wherein said bypass valve is disposed on an outside relative to a straight line connecting between said supercharger and said humidifier, and is disposed in the vicinity of said supercharger and said humidifier.

9. The intake structure in a fuel cell powered vehicle as set forth in claim 8, further comprising an inter cooler connected to the output side of said supercharger and operative to regulate the pressure of air supplied to said humidifier, wherein said inter cooler is disposed on the outside relative to said straight line, and said bypass valve is disposed in a space surrounded by said supercharger, said humidifier, and said inter cooler.

10. An intake structure in a fuel cell powered vehicle, comprising:

a fuel cell for generating electric power supplied to a motor serving as a drive source for said vehicle, using air and hydrogen as fuels;

a supercharger for compressing the outside air and outputting said compressed air; and a humidifier for humidifying said air compressed by said supercharger, supplying said compressed and humidified air to said fuel cell, separating water vapor contained in an off-gas discharged from said fuel cell and humidifying the air newly supplied to said fuel cell, wherein said supercharger is disposed rearwardly of the fuel cell and in a periphery of and adjacently to said humidifier, and wherein said compressed and humidified air flows from the supercharger to a forward side of said fuel cell, wherein said supercharger is disposed in a position that is higher in the vehicle and further toward a rear of the vehicle than each of the humidifier and the fuel cell.

11. The intake structure in a fuel cell powered vehicle as set forth in claim 10, wherein said humidifier has a water vapor exchange portion extending in the vehicle width direction, and at least one of said supercharger, said fuel cell, and said control unit is disposed so as to face the outer periphery of said water vapor exchange portion, wherein said water vapor exchange portion is a hollow-fiber membrane portion.

12. The intake structure in a fuel cell powered vehicle as set forth in claim 10, wherein said humidifier has a water vapor exchange portion is provided in a casing having a hollow cylindrical shape elongate in the vehicle width direction, and the casing is surrounded by a cylindrically-shaped discharge duct having a chamber portion and a discharge port connected to the supercharger.

13. The intake structure in a fuel cell powered vehicle as set forth in claim 10, wherein said fuel cell is disposed in the periphery of and adjacently to said humidifier.

14. The intake structure in a fuel cell powered vehicle as set forth in claim 13, further comprising:

a control unit for controlling the supply of electric power to said motor, wherein said control unit is disposed in the periphery of and adjacently to said humidifier.

15. The intake structure in a fuel cell powered vehicle as set forth in claim 10, further comprising:

a control unit for controlling the supply of electric power to said motor, wherein said control unit is disposed in the periphery of and adjacently to said humidifier.

16. The intake structure in a fuel cell powered vehicle as set forth in claim 15, wherein said supercharger, said fuel cell, and said control unit are disposed in a pattern around said humidifier that is substantially ring-shaped.

17. The intake structure in a fuel cell powered vehicle as set forth in claim 10, further comprising:

a bypass passage for connecting an output side of said supercharger and said fuel cell to each other while bypassing said humidifier; and a bypass valve for opening and closing said bypass passage, wherein said bypass valve is disposed on an outside relative to a straight line connecting between said supercharger and said humidifier, and is disposed in the vicinity of said supercharger and said humidifier.

* * * * *